US011619293B2

(12) United States Patent
Hasegawa

(10) Patent No.: US 11,619,293 B2
(45) Date of Patent: Apr. 4, 2023

(54) DIFFERENTIAL HOUSING

(71) Applicant: TOYOTA JIDOSHA KABUSHIKI KAISHA, Toyota (JP)

(72) Inventor: Takahiro Hasegawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/533,542

(22) Filed: Nov. 23, 2021

(65) Prior Publication Data

US 2022/0221043 A1 Jul. 14, 2022

(30) Foreign Application Priority Data

Jan. 14, 2021 (JP) ............................. JP2021-004173

(51) Int. Cl.
*F16H 57/037* (2012.01)
*F16H 57/025* (2012.01)
(Continued)

(52) U.S. Cl.
CPC ......... *F16H 57/037* (2013.01); *F16H 57/021* (2013.01); *F16H 57/025* (2013.01); *F16H 57/03* (2013.01)

(58) Field of Classification Search
CPC ...... F16H 57/021; F16H 57/025; F16H 57/03; F16H 57/037; F16H 2057/02052; B60B 35/16; B60B 35/166; B60K 17/16
(Continued)

(56) References Cited

U.S. PATENT DOCUMENTS 2,056,881 A * 10/1936 Alden ..................... F16H 48/08
475/230
2,478,180 A * 8/1949 Buckendale .......... B60B 35/166
74/607
(Continued)

FOREIGN PATENT DOCUMENTS

CN 104595467 A * 5/2015 ............. B60K 17/16
CN 104791454 A * 7/2015
(Continued)

OTHER PUBLICATIONS

CN 208331172 U (Hua-xian Yu) May 3, 2018, full text. (Year: 2018).*
(Continued)

*Primary Examiner* — Joseph Brown
(74) *Attorney, Agent, or Firm* — Sughrue Mion, PLLC

(57) ABSTRACT

Each of a differential carrier and a differential retainer of a differential housing includes a bearing attachment portion, a flange portion, and a mount portion. The flange portion of the differential carrier and the flange portion of the differential retainer are fastened to each other via a plurality of through-holes provided in at least either one of the flange portion of the differential carrier and the flange portion of the differential retainer. At least either one of the differential carrier and the differential retainer includes a plurality of reinforcement rib portions provided on an outer wall side of the at least either one of the differential carrier and the differential retainer, the reinforcement rib portions extending from the position of the bearing attachment portion toward the positions of some of or all of the through-holes and the mount portion.

8 Claims, 14 Drawing Sheets

(51) Int. Cl.
*F16H 57/03* (2012.01)
*F16H 57/021* (2012.01)

(58) Field of Classification Search
USPC ................................................ 74/606 R, 607
See application file for complete search history.

(56) References Cited

U.S. PATENT DOCUMENTS

| | | | | |
|---|---|---|---|---|
| 2,480,836 | A * | 9/1949 | Buckendale | B60K 17/16 |
| | | | | 74/370 |
| 2,548,258 | A * | 4/1951 | Griffith | B60K 17/16 |
| | | | | 475/245 |
| 4,086,826 | A * | 5/1978 | Von Kaler | F16H 48/08 |
| | | | | 475/246 |
| 6,688,433 | B1 * | 2/2004 | Hauser | F16H 39/08 |
| | | | | 184/6.24 |
| 2004/0018910 | A1 * | 1/2004 | Krzesicki | F16H 48/08 |
| | | | | 475/230 |
| 2006/0160651 | A1 | 7/2006 | Petruska et al. | |

FOREIGN PATENT DOCUMENTS

| | | | | |
|---|---|---|---|---|
| CN | 208331172 | U | * 1/2019 | |
| CN | 209977214 | U | * 1/2020 | |
| CN | 111823486 | A | * 10/2020 | ......... B29C 45/1418 |
| DE | 102007011029 | A1 | * 9/2008 | ......... F16H 57/0483 |
| JP | 2001-146956 | A | 5/2001 | |
| JP | 2006-200743 | A | 8/2006 | |

OTHER PUBLICATIONS

CN 208331172 U (Xu-chen Zhang) Oct. 27, 2020, full text. (Year: 2020).*

* cited by examiner

DIFFERENTIAL HOUSING

CROSS-REFERENCE TO RELATED APPLICATION

This application claims priority to Japanese Patent Application No. 2021-004173 filed on Jan. 14, 2021, incorporated herein by reference in its entirety.

BACKGROUND

1. Technical Field

This disclosure relates to a differential housing.

2. Description of Related Art

In recent years, a differential device including a differential gear has been used to distribute one engine output to two different rotation speeds in an automobile. The differential device can be accommodated in a differential housing in a state where a shaft such as an axle shaft (a drive shaft) or a propeller shaft is kept rotatable. The differential housing can be configured to be dividable into two, i.e., a differential carrier and a differential retainer.

A differential device described in Japanese Unexamined Patent Application Publication No. 2001-146956 (JP 2001-146956 A) has a structure in which reinforcement ribs are provided radially from a bearing attachment portion so as to disperse a load applied to the bearing attachment portion.

SUMMARY

However, the differential device described in JP 2001-146956 A has room for optimizing the structure of the reinforcement ribs. It is desired to reduce more weight by reducing the sectional areas of the reinforcement ribs by optimizing the structure.

This disclosure is intended to provide a differential housing that can achieve a reduction in weight by reducing the sectional areas of reinforcement rib portions configured to disperse a load applied to a bearing attachment portion.

A differential housing according to one aspect of this disclosure is a differential housing including a differential carrier and a differential retainer. Each of the differential carrier and the differential retainer includes a bearing attachment portion, a flange portion, and a mount portion. A bearing configured to hold a shaft is attached to a bearing attachment portion. The differential carrier and the differential retainer are fastened to each other via the flange portion. The mount portion is provided in the flange portion such that the differential housing is attached to a vehicle body via the mount portion. The flange portion of the differential carrier and the flange portion of the differential retainer are fastened to each other via a plurality of through-holes provided in at least either one of the flange portion of the differential carrier and the flange portion of the differential retainer. At least either one of the differential carrier and the differential retainer includes a plurality of reinforcement rib portions provided on an outer wall side of the at least either one of the differential carrier and the differential retainer, the reinforcement rib portions extending from the position of the bearing attachment portion to the positions of some of or all of the through-holes and the mount portion. With such a configuration, the differential housing can achieve a reduction in weight by reducing the sectional areas of the reinforcement rib portions configured to disperse a load applied to the bearing attachment portion.

The bearing attachment portion of the each of the differential carrier and the differential retainer may be a part where the bearing is attached to a plurality of recessed portions provided on an inner wall of the each of the differential carrier and the differential retainer. The reinforcement rib portions may include a reinforcement rib portion provided on the outer wall side of the at least either one of the differential carrier and the differential retainer and extending from a position of one of the recessed portions. Hereby, a load on the recessed portion to which the load is applied most can be dispersed, thereby making it possible to further reduce the sectional areas.

The reinforcement rib portions may include two or more reinforcement rib portions provided on the outer wall side of the at least either one of the differential carrier and the differential retainer and extending in a divided manner from a position of one of the recessed portions. Hereby, the reinforcement rib portions can be disposed in a triangle shape, thereby making it possible to further reduce the sectional areas.

The reinforcement rib portions may include two or more reinforcement rib portions provided on the outer wall side of the at least either one of the differential carrier and the differential retainer and extending to merge at a position corresponding to one of the through-holes and the mount portion. Hereby, the reinforcement rib portions can be disposed in a triangle shape, thereby making it possible to further reduce the sectional areas.

The reinforcement rib portions may be provided in both the differential carrier and the differential retainer. This makes it possible to efficiently reinforce the differential housing.

The reinforcement rib portions may include a first reinforcement rib portion directed toward the mount portion, and a second reinforcement rib portion directed toward a corresponding one of the through-holes. The sectional area of the first reinforcement rib portion along a plane perpendicular to an extending direction of the first reinforcement rib portion may be larger than the sectional area of the second reinforcement rib portion along a plane perpendicular to an extending direction of the second reinforcement rib portion. This makes it possible to selectively reinforce the mount portion that receives more load.

The differential carrier may include an additional bearing attachment portion to which an additional bearing configured to hold an additional shaft perpendicular to the shaft is attached, and a U-shaped reinforcement rib portion extending from a first part of the flange portion of the differential carrier toward a second part of the flange portion by detouring around the additional bearing attachment portion. This makes it possible to achieve a reduction in weight by reducing the sectional areas of the reinforcement rib portions configured to disperse a load applied to the additional bearing attachment portion.

With this disclosure, it is possible to provide a differential housing that can achieve a reduction in weight by reducing the sectional areas of reinforcement rib portions configured to disperse a load applied to a bearing attachment portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The following describes the present disclosure based on an embodiment of the disclosure but is not intended to limit the disclosure according to Claims to the following embodiment. Further, all constituents described in the embodiment are not necessarily essential as the means for solving the problem of the disclosure.

Embodiment

Figure 1:
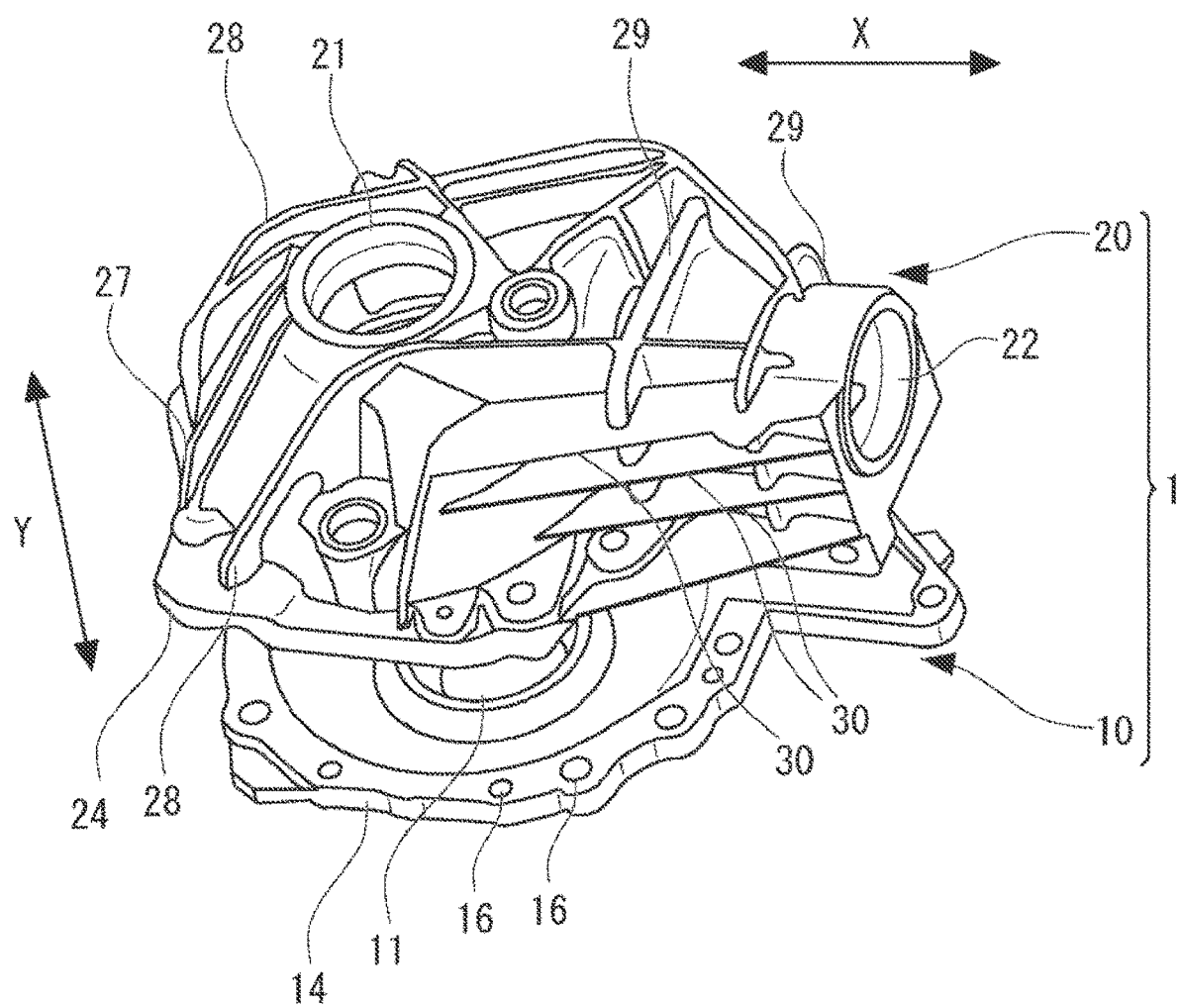
FIG. 1 is a schematic perspective view illustrating one exemplary configuration of a differential housing according to an embodiment.

With reference to drawings, the following describes an embodiment. FIG. 1 is a schematic perspective view illustrating one exemplary configuration of a differential housing according to the embodiment. As illustrated in FIG. 1, a differential housing 1 according to the present embodiment includes a differential carrier 20 and a differential retainer 10.

The differential housing 1 is used as a housing for a differential device (a differential gear) and can be manufactured by aluminum die-casting by use of a material such as aluminum alloy, for example. However, the differential housing 1 is not limited to this. The differential housing 1 may be used for a front differential device or may be used for a rear differential device.

Inside the differential housing 1, bearings configured to rotatably support shafts from a vehicle-body side are provided, and a differential case and other differential built-in components as components of the differential device can be also provided. These shafts can include a propeller shaft and an axle shaft (also referred to as a drive shaft in some cases). In the example of FIG. 1, an X-direction indicates the front-rear direction of a vehicle body (the longitudinal direction of the propeller shaft), and a Y-direction indicates the right-left direction of the vehicle body (the longitudinal direction of the drive shaft or the axle shaft).

Although not illustrated herein, the differential device can be provided with a differential mechanism and a ring gear as the built-in components. The differential mechanism can be configured, for example, such that two side gears connected to an axle are provided on the right and left sides, respectively, and two pinion gears are provided so as to mesh with the two side gears. Respective shafts serving as pivots are attached to the gears, and the shafts are held inside the differential case via respective bearings. A ring gear can be fixed to an outer peripheral portion of the differential case by welding.

The differential carrier 20 is a part in which a main part of the differential device is stored, and the differential retainer 10 is a part corresponding to a cap of the differential housing 1. As such, the differential housing 1 can have a structure divided in two, i.e., the differential carrier 20 and the differential retainer 10 and can be also referred to as a differential housing assembly. By employing such a divided structure, the differential mechanism and so on can be assembled.

A main body of the differential retainer 10 has an opening 11 into which a shaft (hereinafter referred to as a first shaft) such as a vehicle-body side shaft (not illustrated) is loosely inserted. A main body of the differential carrier 20 has an opening 21 into which the first shaft or a shaft coaxial with the first shaft is loosely inserted. The following description is made on the premise that the first shaft is constituted by one shaft, for simplification of the description, but the first shaft may be constituted by two shafts (e.g., a pair of shafts) including the first shaft and the shaft coaxial with the first shaft as described above.

The first shaft can be an axle shaft (a drive shaft) in the example of FIG. 1. Note that what type of shaft is employable as the first shaft varies depending on the arrangement of the differential device in the vehicle body or the structure of the differential device.

Further, the main body of the differential carrier 20 has an opening 22 into which an additional vehicle-body side shaft (not illustrated) extending in a direction perpendicular to the first shaft loosely inserted into the opening 21 is loosely inserted. The additional shaft used herein (hereinafter referred to as a second shaft) is a shaft perpendicular to the first shaft and can be a propeller shaft, for example. Note that, as the second shaft, a shaft of a type different from the first shape is also employable depending on the arrangement of the differential device in the vehicle body or the structure of the differential device.

The differential carrier 20 includes a bearing attachment portion 23, a flange portion 24, mount portions 25, and reinforcement rib portions 27, 28. The differential retainer 10 includes a bearing attachment portion 13, a flange portion 14, mount portions 15, and reinforcement rib portions 17, 18. The following describes details of these portions.

Figure 2:
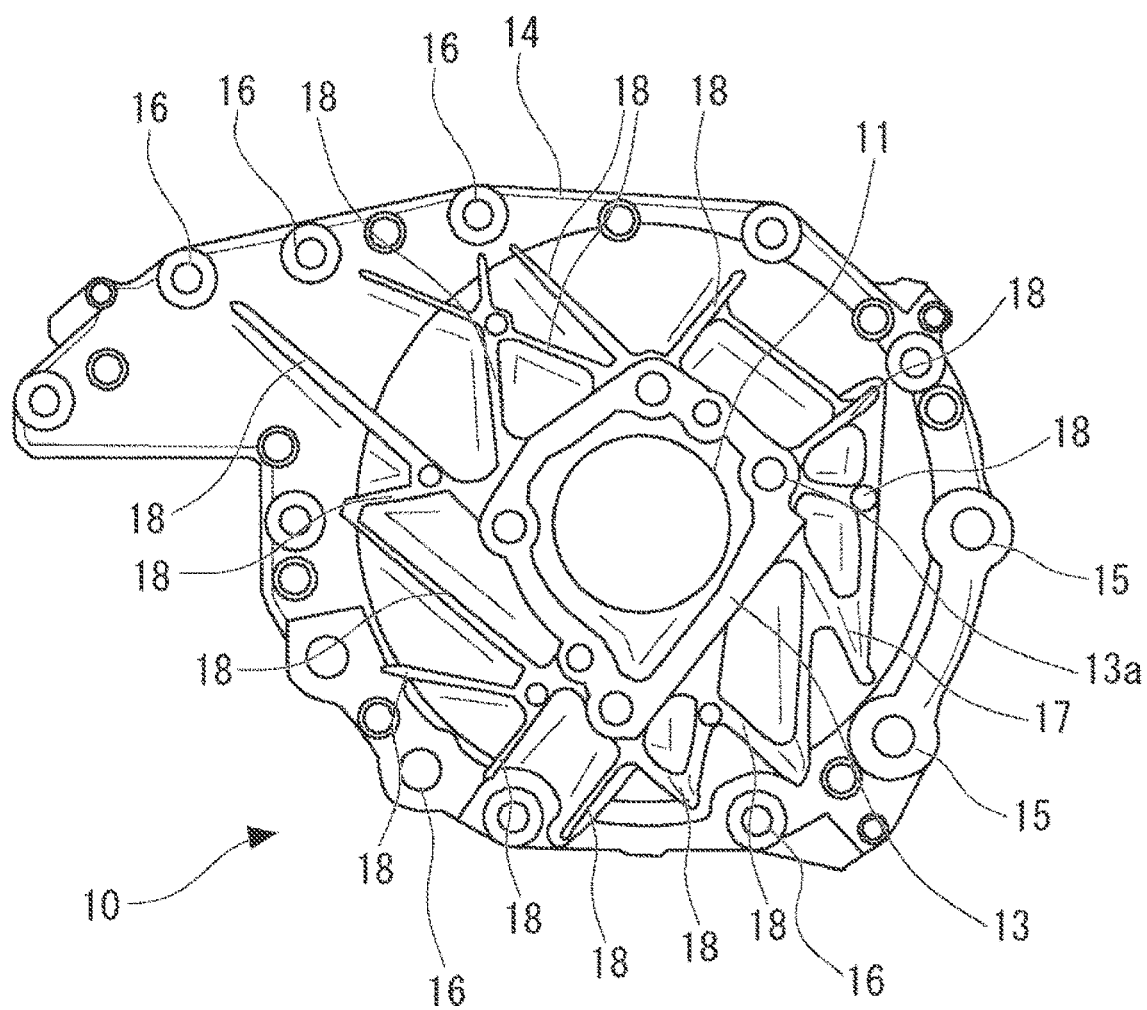
FIG. 2 is a schematic view illustrating an outer wall side of a differential retainer in FIG. 1.

With reference to FIG. 2, the differential retainer 10 will be described first. FIG. 2 is a view illustrating an outer wall side of the differential retainer 10 in FIG. 1. As illustrated in FIG. 2, the differential retainer 10 includes the bearing attachment portion 13 on the outer wall side. The first shaft is rotatably held by a bearing (not illustrated) attached to the bearing attachment portion 13 in a state where the first shaft is loosely inserted into the opening 11. Note that the following description deals with an example in which the bearing attachment portion 13 is provided on the outer wall side of the differential retainer 10, but the bearing attachment portion 13 may be provided on an inner wall side of the differential retainer 10.

The bearing attachment portion 13 is a part to which a bearing for holding the first shaft is attached and can include recessed portions 13a. FIG. 2 illustrates an example in which the bearing attachment portion 13 includes four large recessed portions 13a and two small recessed portions 13a. The recessed portions 13a to be provided can be bottomed holes, but some of or all of the recessed portions 13a may be provided as through-holes. Note that the shapes of the recessed portions 13a along a plane perpendicular to the depth direction of the recessed portions 13a are a round shape as illustrated herein but is not limited to this. The recessed portions 13a may have any shape, provided that the shapes of the recessed portions 13a fit the shapes of projection portions provided on the bearing side.

The differential retainer 10 includes the flange portion 14 via which the differential retainer 10 is fastened to the differential carrier 20. The flange portion 14 is provided in the periphery of the differential retainer 10 (a periphery on a plane perpendicular to the first shaft to be loosely inserted into the opening 11). The flange portion 14 includes two mount portions 15. The number of the mount portions 15 should be one or more but is desirably two or more. Note that the arrangement of the mount portions 15 is not limited to the arrangement illustrated herein. Further, a plurality of through-holes 16 is provided in the flange portion 14 such that the differential carrier 20 is fastened to the differential retainer 10 via the through-holes 16. The flange portion 14 is a part fastened to the flange portion 24 on the differential carrier 20 side via the through-holes 16 and projection portions 26 (described later). The through-holes 16 can be also referred to as fastening holes. The flange portions 14, 24 are parts for fastening the differential retainer 10 and the differential carrier 20 to each other via the fastening holes. Note that it is desirable that a fastening surface between the flange portion 14 and the flange portion 24, that is, a fastening surface between the differential retainer 10 and the differential carrier 20 be formed perpendicularly to the axis of the first shaft.

The mount portions 15 are provided in the flange portion 14 and serve as parts via which the differential housing 1 with a differential device being accommodated therein is attached to the vehicle body. The attachment of the differential housing 1 to the vehicle body is performed by positioning the mount portions 15 with the mount portions 25 (described later). Note that the present embodiment deals with an example in which the mount portions 25 include projection portions (not illustrated) for attachment to the vehicle body, and in a state where the projection portions are fitted to the mount portions 15 as through-holes, the differential housing 1 is attached to the vehicle body side. However, the present disclosure is not limited to this.

Further, as illustrated in FIG. 2, the differential retainer 10 includes a plurality of reinforcement rib portions provided on the outer wall side of the differential retainer 10 such that the reinforcement rib portions extend (are formed outwardly to extend) from the position of the bearing attachment portion 13 toward respective positions of some of or all of the through-holes 16 and the mount portions 15. The reinforcement rib portion 17 is an example of a reinforcement rib portion extending from the position of the bearing attachment portion 13 toward the position of the mount portion 15. The reinforcement rib portion 18 is an example of a reinforcement rib portion extending from the position of the bearing attachment portion 13 toward the position of the through-hole 16. The number of the reinforcement rib portions 17 and the sectional shape of the reinforcement rib portion 17 in the extending direction thereof are not limited in particular. The number of the reinforcement rib portions 18 and the sectional shape of the reinforcement rib portion 18 in the extending direction thereof are also not limited in particular.

The bearing attachment portion 13 of the differential retainer 10 is a part where the bearing is attached to the recessed portions 13a provided on the outer wall of the differential retainer 10 in the vicinity of the opening 11. In this case, the reinforcement rib portions provided in the differential housing 1 can include a reinforcement rib portion (the reinforcement rib portion 18 or the like) provided on the outer wall side of the differential retainer 10 and extending from the position of one of the recessed portions 13a. Note that the reinforcement rib portion extending from the position of one of the recessed portions 13a may be the reinforcement rib portion 17 extending to the mount portion 15. Hereby, a load on the recessed portion 13a to which the load is applied most can be dispersed, so that a load applied to the bearing attachment portion 13 can be more effectively released, thereby consequently making it possible to reduce the sectional area of the reinforcement rib portion.

Figure 3:
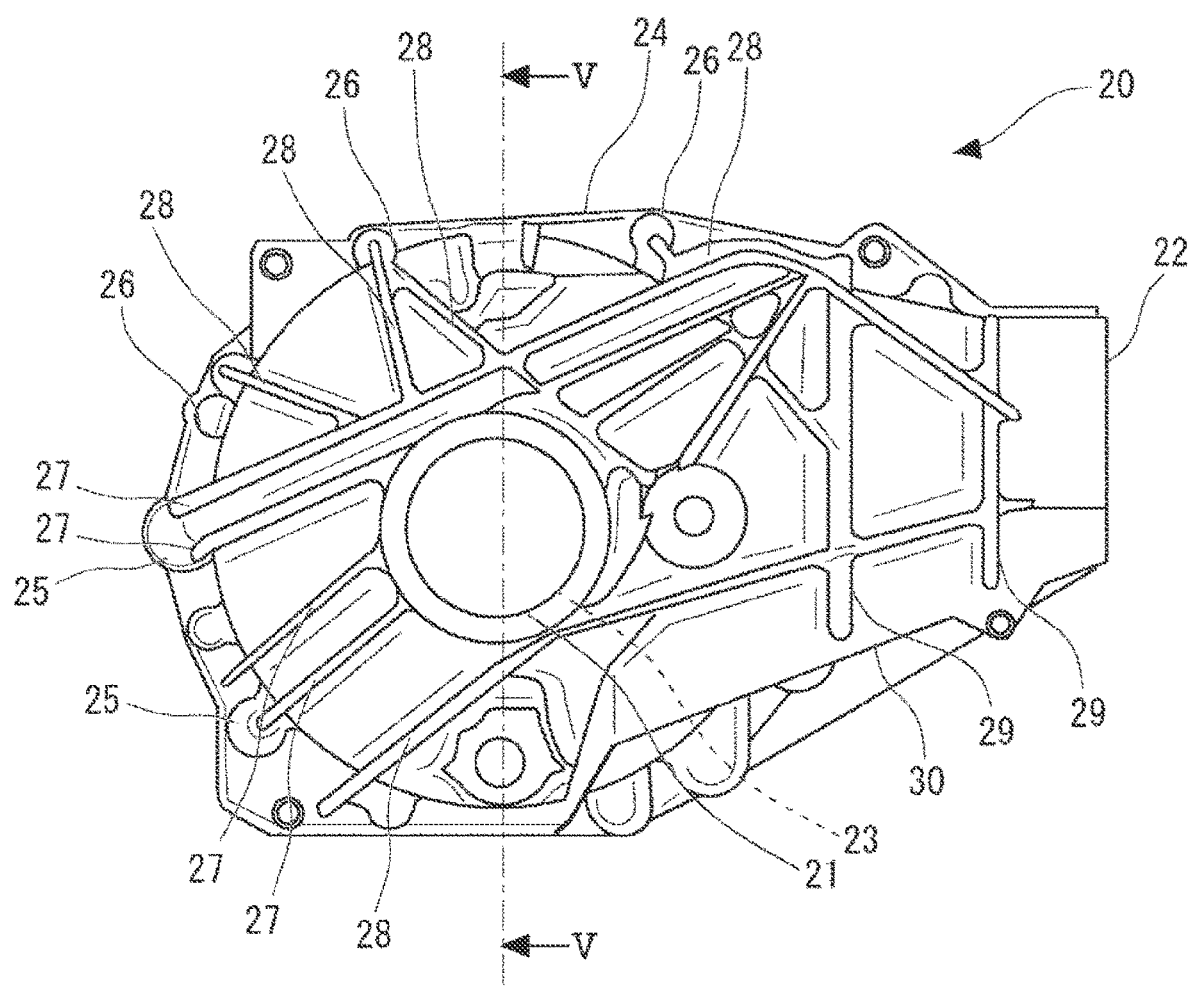
FIG. 3 is a schematic view illustrating an outer wall side of a differential carrier in FIG. 1.
Figure 4:
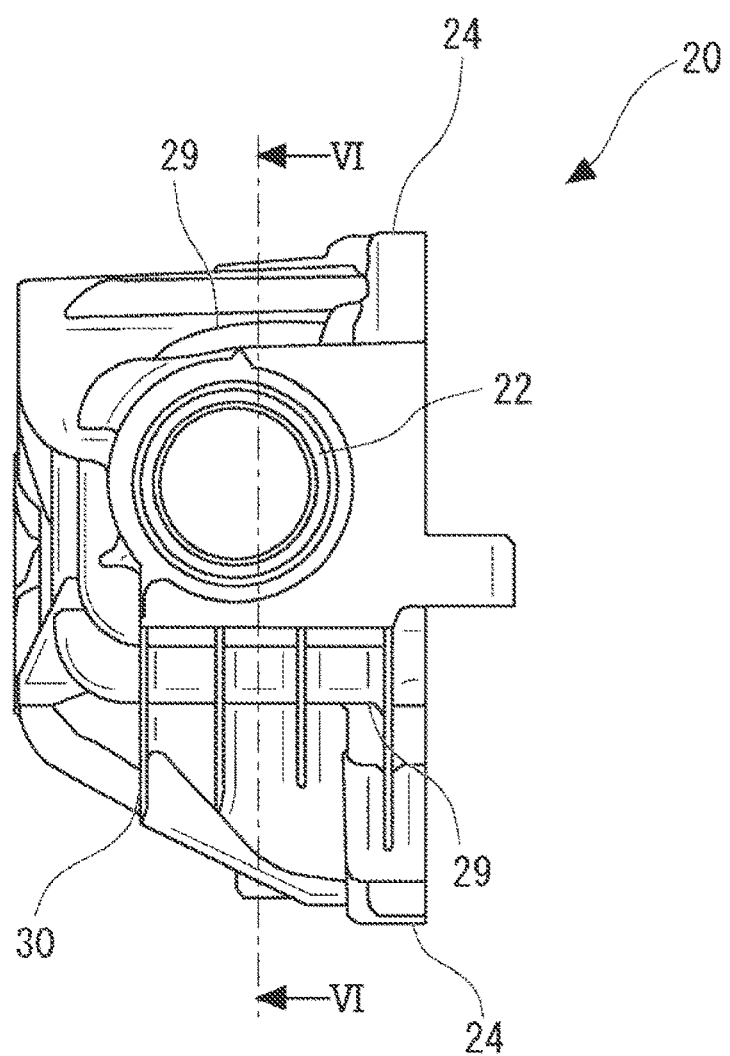
FIG. 4 is a schematic side view of the differential carrier in FIG. 3.
Figure 5:
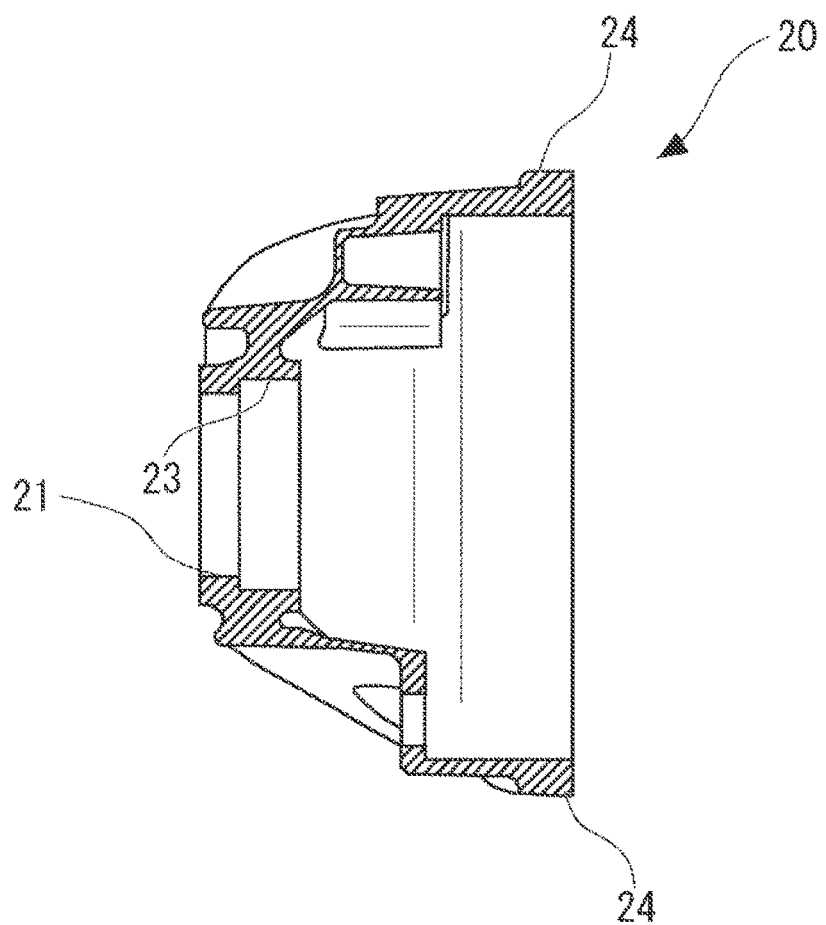
FIG. 5 is a V-V direction sectional view of the differential carrier in FIG. 3.
Figure 6:
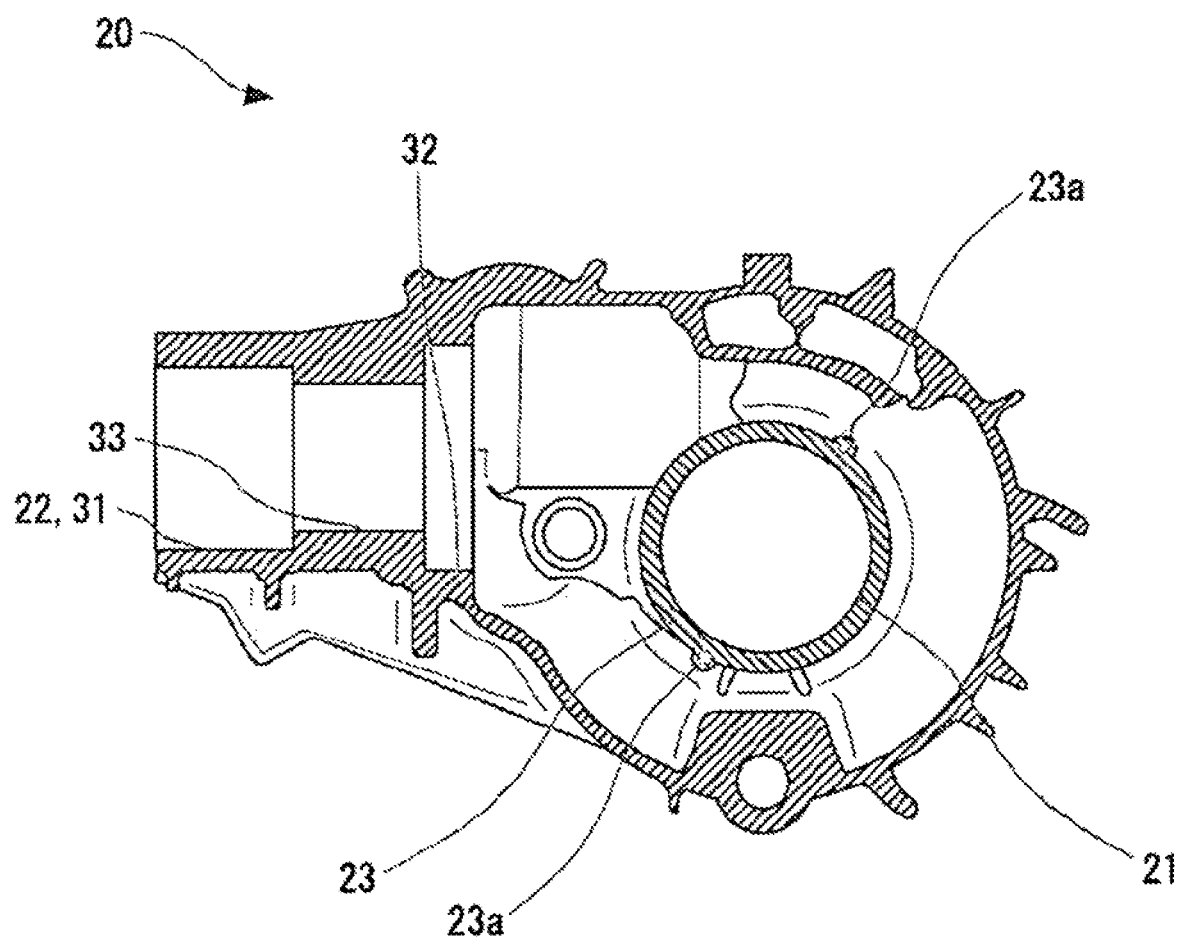
FIG. 6 is a VI-VI direction sectional view of the differential carrier in FIG. 4.

With reference to FIGS. 3 to 6, the differential carrier 20 will be described. FIG. 3 is a schematic view illustrating an outer wall side of the differential carrier 20 in FIG. 1, and FIG. 4 is a schematic side view of the differential carrier 20 in FIG. 3. Further, FIG. 5 is a V-V direction sectional view of the differential carrier 20 in FIG. 3, and FIG. 6 is a VI-VI direction sectional view of the differential carrier 20 in FIG. 4.

As illustrated in FIGS. 3, 5, 6, the differential carrier 20 includes the bearing attachment portion 23 on an inner wall side thereof. The first shaft is rotatably held by a bearing (not illustrated) attached to the bearing attachment portion 23 in a state where the first shaft is loosely inserted into the opening 21. Note that the following description deals with an example in which the bearing attachment portion 23 is provided on the inner wall side of the differential carrier 20, but the bearing attachment portion 23 may be provided on the outer wall side of the differential carrier 20.

The bearing attachment portion 23 is a part to which a bearing for holding the first shaft is attached and can be provided with recessed portions 23a as illustrated in FIG. 6. FIG. 6 illustrates an example in which the recessed portions 23a are provided at two parts in a direction of a plane perpendicular to the axis of the first shaft. Note that FIG. 6 illustrates a section in a state where the bearing is attached for convenience, and a part illustrated as the bearing attachment portion 23 illustrates a section of the bearing. The recessed portions 23a to be provided can be bottomed holes. The recessed portions 23a may have any shape, provided that the shapes of the recessed portions 23a fit the shapes of projection portions provided on the bearing side. Note that, instead of the recessed portions 23a, recessed portions similar to the recessed portions 13a formed in a direction horizontal to the axis of the first shaft can be employed.

The differential carrier 20 includes the flange portion 24 via which the differential carrier 20 is fastened to the differential retainer 10. The flange portion 24 is formed in the periphery of the differential carrier 20 (a periphery on a plane perpendicular to the first shaft to be loosely inserted into the opening 21). The flange portion 24 includes one or more mount portions 25 provided at positions corresponding to the mount portions 15. Further, the flange portion 24 can be provided with a plurality of projection portions 26 to be fitted to the through-holes 16, respectively, such that the differential carrier 20 is fastened to the differential retainer 10. Note that, in the figures, the projection portions 26 do not have a projecting shape, but the projection portions 26 project toward the through-hole 16 side. The flange portion 24 is a part fastened to the flange portion 14 on the differential retainer 10 side via the through-holes 16 and the projection portions 26. However, the flange portion 24 of the differential carrier 20 and the flange portion 14 of the differential retainer 10 should be fastened to each other via a plurality of through-holes provided in at least ether one of the flange portion 24 and the flange portion 14. For example, projection portions may be provided instead of some of or all of the through-holes 16, and through-holes may be provided instead of the projection portions 26 corresponding to the through-holes 16.

The mount portions 25 are provided in the flange portion 24 and serve as parts via which the differential housing 1 with the differential device being accommodated therein is attached to the vehicle body. As described above, the differential housing 1 is attached to the vehicle body by positioning the mount portions 15 with the mount portions 25.

Further, as illustrated in FIG. 3, the differential carrier 20 includes a plurality of reinforcement rib portions provided on the outer wall side of the differential carrier 20 such that the reinforcement rib portions extend (are formed outwardly to extend) from the position of the bearing attachment portion 23 toward respective positions of some of or all of the projection portions 26 and the mount portions 25. The reinforcement rib portion 27 is an example of a reinforcement rib portion extending from the position of the bearing attachment portion 23 toward the position of the mount portion 25. The reinforcement rib portion 28 is an example of a reinforcement rib portion extending from the position of the bearing attachment portion 23 toward the position of the projection portion 26 (that is, the position of the through-hole 16). The number of the reinforcement rib portions 27 and the sectional shape of the reinforcement rib portion 27 in the extending direction thereof are not limited in particular. The number of the reinforcement rib portions 28 and the sectional shape of the reinforcement rib portion 28 in the extending direction thereof are also not limited in particular.

Further, the bearing attachment portion 23 of the differential carrier 20 is a part where the bearing is attached to the recessed portions 23*a* provided on the inner wall of the differential carrier 20 in the vicinity of the opening 21. In this case, the reinforcement rib portions provided in the differential housing 1 can include a reinforcement rib portion (the reinforcement rib portion 28 or the like) provided on the outer wall side of the differential carrier 20 and extending from the position of one of the recessed portions 23*a*. Note that the reinforcement rib portion extending from the position of one of the recessed portions 23*a* may be the reinforcement rib portion 27 extending to the mount portion 25. Hereby, a load on the recessed portion 23*a* to which the load is applied most can be dispersed, so that a load applied to the bearing attachment portion 23 can be more effectively released, thereby consequently making it possible to reduce the sectional area of the reinforcement rib portion.

Further, as illustrated in FIGS. 1, 3, and 4, the differential carrier 20 can include reinforcement rib portions 30 provided on the outer wall side of the differential carrier 20 such that the reinforcement rib portions 30 further reinforce the reinforcement rib portions 28 directed to the positions of the through-holes 16 along the reinforcement rib portions 28. Particularly, it is preferable that the reinforcement rib portions 30 be provided in a part of the flange portion 25 where the reinforcement rib portions 27, 28 are provided at large intervals when they are viewed from above the outer wall.

Further, in this example, the reinforcement rib portions 30 are three plate-shaped rib portions parallel to each other, but the shape and the number of the reinforcement rib portions 30 are not limited in particular, provided that the reinforcement rib portions 30 can further reinforce the reinforcement rib portions 28. It can be said that this allows the reinforcement rib portions 28 to be formed to be thin. Further, although not illustrated herein, the differential carrier 20 can also include a reinforcement rib portion provided on the outer wall side of the differential carrier 20 such that the reinforcement rib portion further reinforces the reinforcement rib portions 27 directed to the positions of the mount portions 25 along the reinforcement rib portions 27. Note that a similar idea is also applicable to the differential retainer 10.

Further, as described above, as illustrated in FIGS. 1, 4, and 6, the differential carrier 20 can have the opening 22 into which the second shaft perpendicular to the first shaft is loosely inserted. The second shaft loosely inserted to the opening 22 can be rotatably maintained by additional bearings (not illustrated) provided in the differential carrier 20. As illustrated in FIG. 6, two additional bearings can be attached to additional bearing attachment portions 31, 32 provided in the differential carrier 20. The number of the additional bearings should be two or more. A cylindrical loose insertion portion 33 into which the second shaft is loosely inserted is provided between the additional bearing attachment portion 31 and the additional bearing attachment portion 32.

Further, it is preferable that the differential carrier 20 include U-shaped reinforcement rib portions 29 separately from the reinforcement rib portions 17, 18, 27, 28 such that the reinforcement rib portions 29 are directed from a first part of the flange portion 24 in the differential carrier 20 toward a second part of the flange portion 24 by detouring around the additional bearing attachment portions 31, 32. In the present embodiment, two additional bearing attachment portions are provided, so that two reinforcement rib portions 29 are provided in total so as to correspond to the two additional bearing attachment portions. Hereby, it is possible to achieve a reduction in weight by reducing the sectional areas of the reinforcement rib portions 29 configured to disperse loads applied to the additional bearing attachment portions 31, 32.

Further, the U-shaped reinforcement rib portions 29 described herein are also applicable to a differential housing that does not include the reinforcement rib portions 17, 18, 27, 28 described above.

With reference to FIGS. 7 to 14, the following describes the reinforcement rib portions 17, 18, the reinforcement rib portions 27, 28, and the reinforcement rib portions 29 that are a main feature of the present embodiment, as well as their effects.

Figure 7:
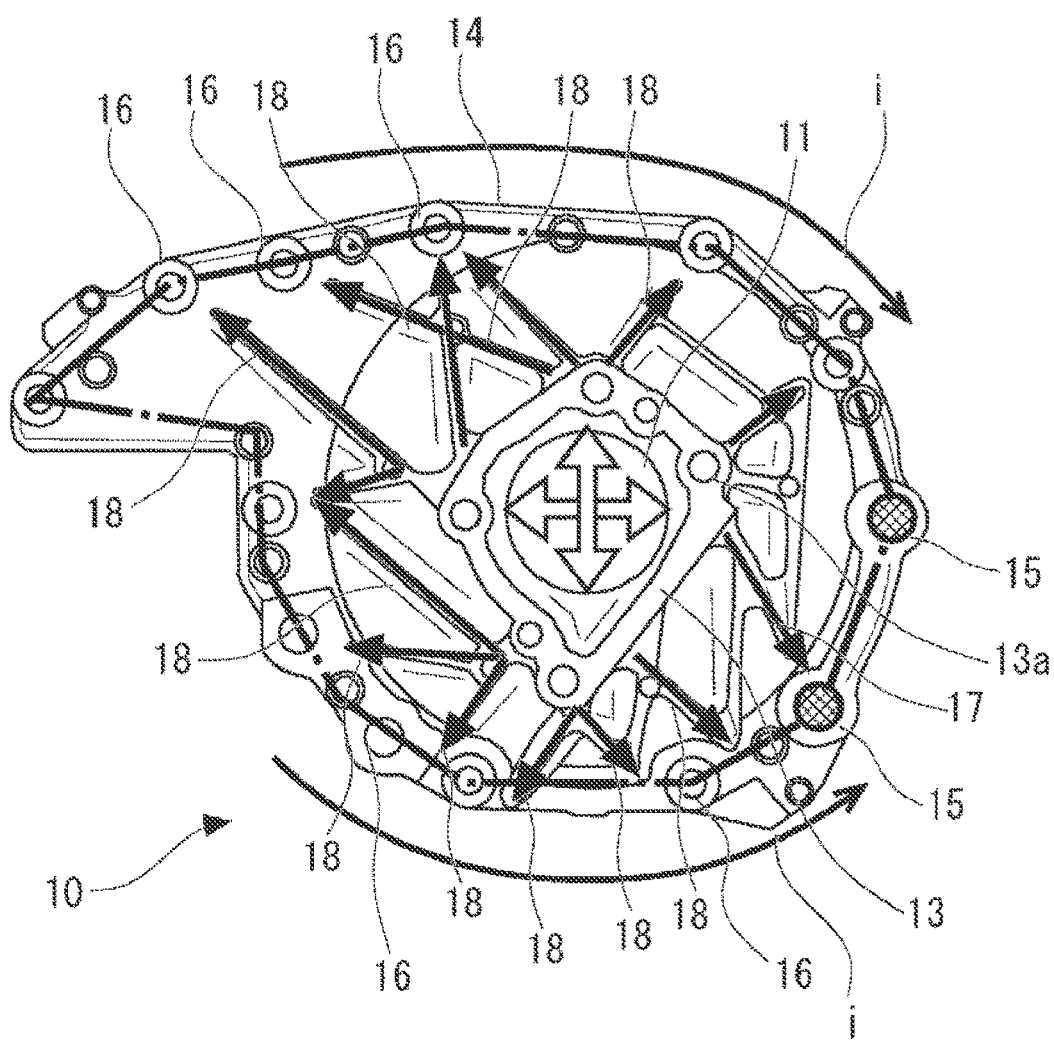
FIG. 7 is a schematic view illustrating a load dispersion state in the differential retainer in FIG. 2.
Figure 8:
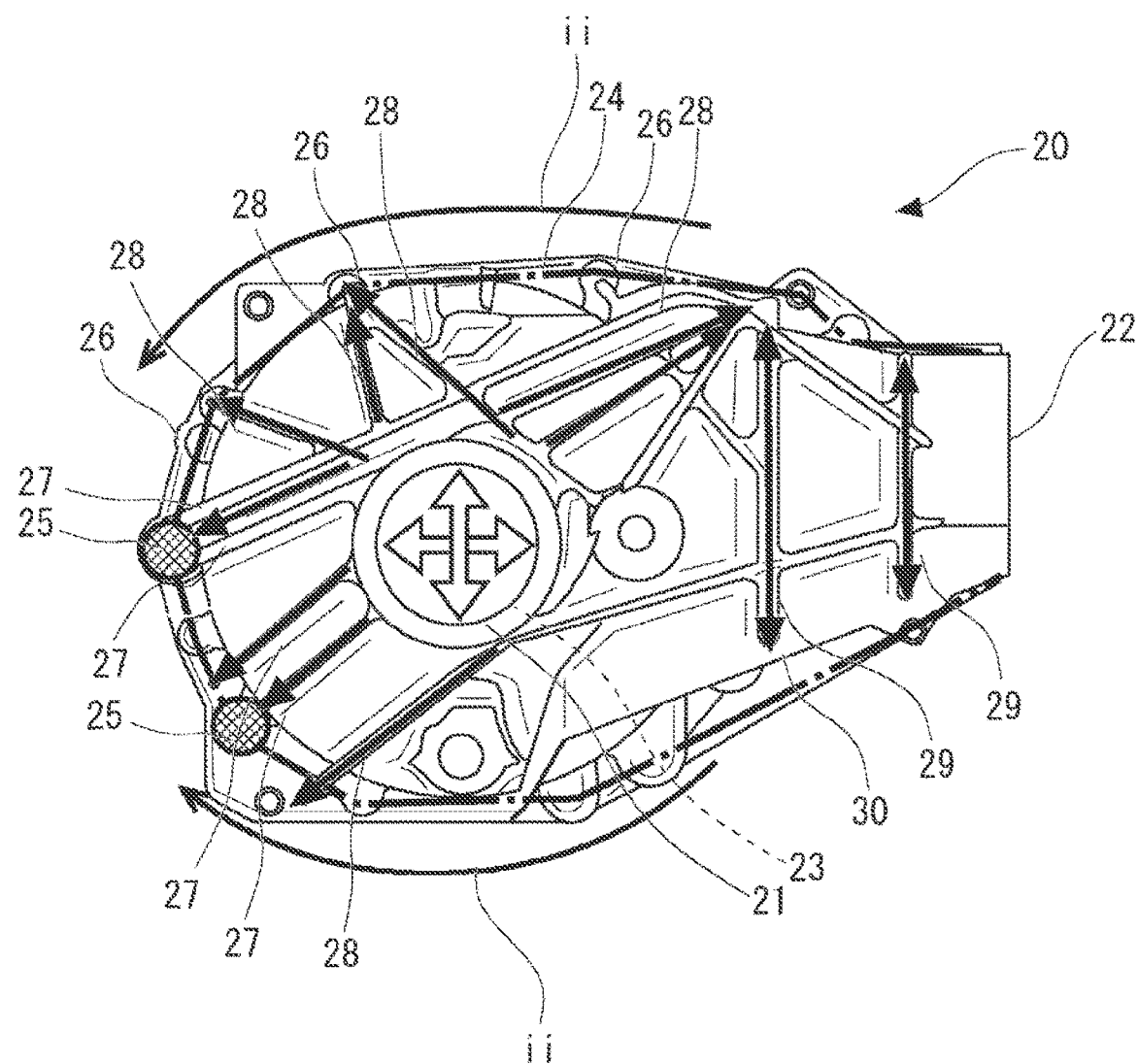
FIG. 8 is a schematic view illustrating a load dispersion state in the differential carrier in FIG. 3.
Figure 9:
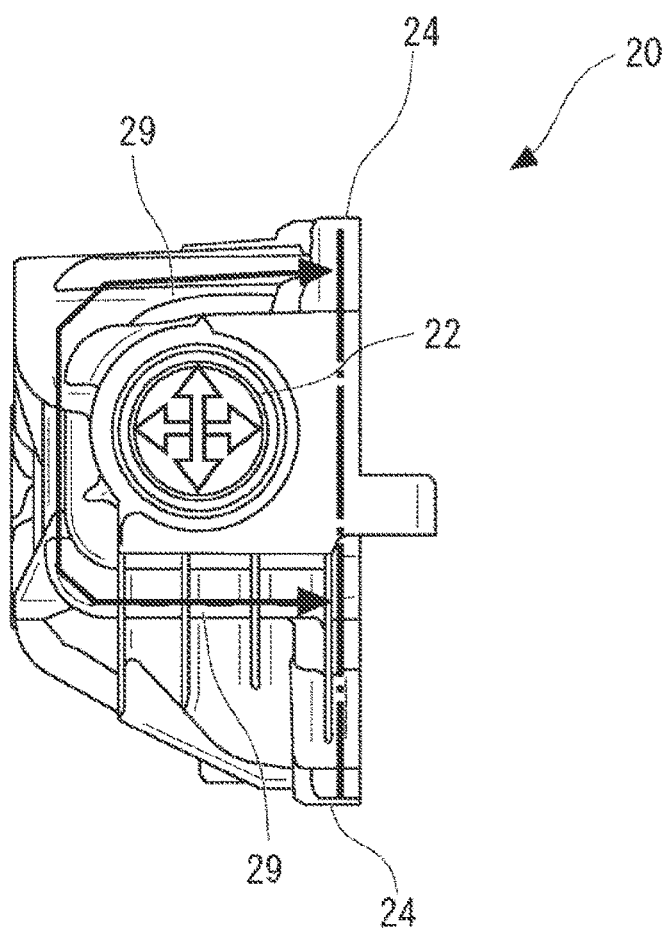
FIG. 9 is a schematic view illustrating a load dispersion state in the differential carrier in FIG. 4.

Further, the following describes an image of load transmission from the first shaft and the second shaft with reference to FIGS. 7 to 9. FIG. 7 is a schematic view illustrating a load dispersion state in the differential retainer 10 in FIG. 2. Further, FIG. 8 is a schematic view illustrating a load dispersion state of the differential carrier 20 in FIG. 3, and FIG. 9 is a schematic view illustrating a load dispersion state in the differential carrier 20 in FIG. 4.

First, as indicated by blank arrows in FIG. 7, a force from the first shaft is applied to the bearing attachment portion 13 on the differential retainer 10 side. The force is transmitted to the flange portion 14 as indicated by an alternate long and short dash line in FIG. 7 through the reinforcement rib portions 17, 18 as indicated by bold arrows in FIG. 7 and then transmitted to the mount portions 15 through the flange portion 14 toward directions of arrows i in FIG. 7. Further, the force is also transmitted directly to the mount portion 15 from the reinforcement rib portion 17. It may be said that the reinforcement rib portions 17, 18 are placed such that the force to be applied is efficiently dispersed through such a transmission route.

Similarly, as indicated by blank arrows in FIG. 8, a force from the first shaft is applied to the bearing attachment portion 23 on the differential carrier 20 side. The force is transmitted to the flange portion 24 as indicated by an alternate long and short dash line in FIG. 8 through the reinforcement rib portions 27, 28 as indicated by bold arrows in FIG. 8 and then transmitted to the mount portions 25 through the flange portion 24 toward directions of arrows ii in FIG. 8. Further, the force is also transmitted directly to the mount portions 25 from the reinforcement rib portions 27. It may be said that the reinforcement rib portions 27, 28 are placed such that the force to be applied is efficiently dispersed through such a transmission route.

Further, the second shaft is as follows. As indicated by blank arrows in FIG. 9, a force from the second shaft is applied to the bearing attachment portions 31, 32 (see FIG. 6) on the opening 22 side, on the differential carrier 20 side. The force is applied mainly to recessed portions (not illustrated) in the bearing attachment portions 31, 32. Then, the force is transmitted to the flange portion 24 as indicated by an alternate long and short dash lines in FIG. 9 through the reinforcement rib portions 29 as indicated by bold arrows in FIG. 9 and then transmitted to the mount portions 25 through the flange portion 24. It may be said that the reinforcement rib portions 29 are placed such that the force to be applied is efficiently dispersed through such a transmission route.

Figure 10:
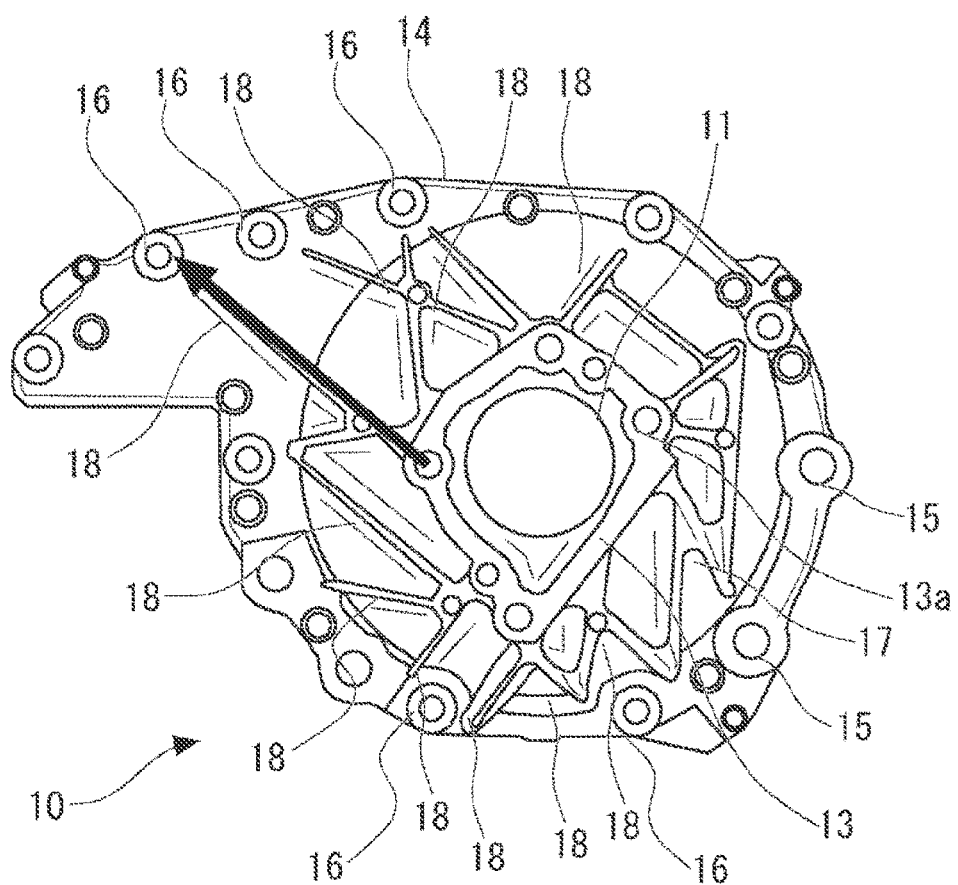
FIG. 10 is a schematic view individually illustrating a load dispersion state in the differential retainer in FIG. 2.
Figure 11:
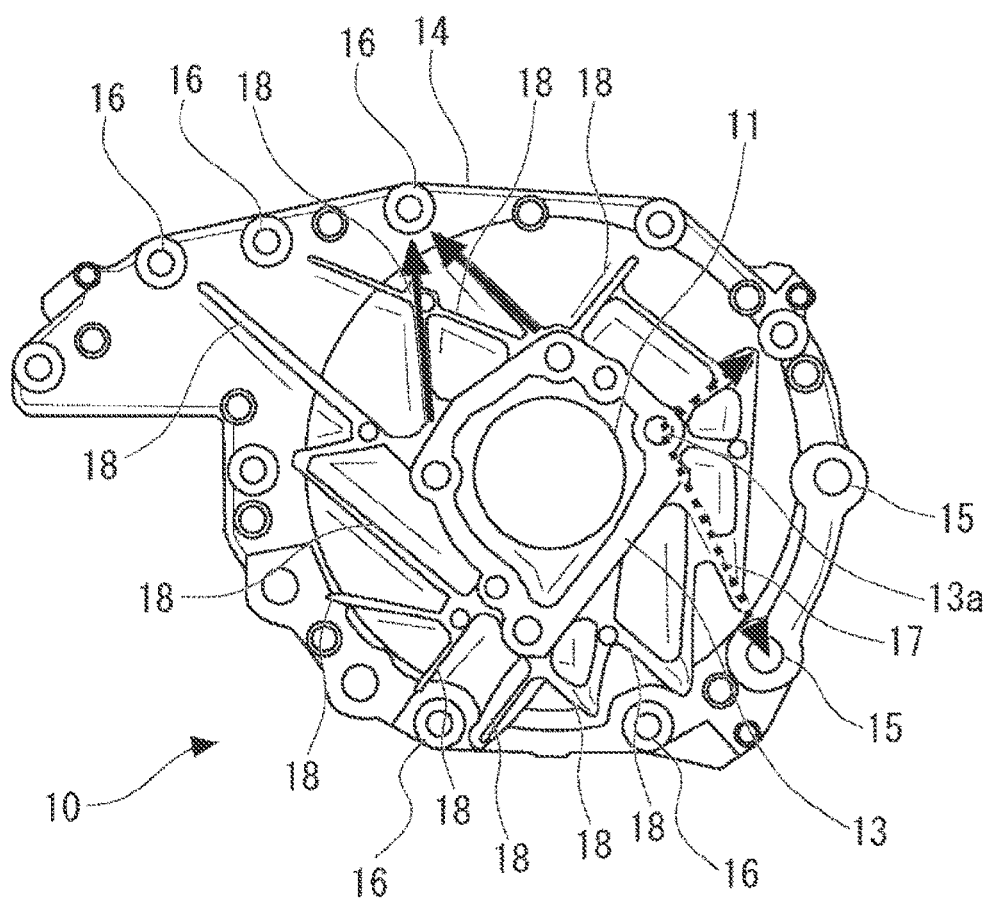
FIG. 11 is a schematic view individually illustrating a load dispersion state in the differential retainer in FIG. 2.

Next will be described details of a dispersion state of the force (load) to be applied in the differential retainer 10, with reference to FIGS. 10, 11. FIGS. 10, 11 are schematic views each individually illustrating a load dispersion state in the differential retainer 10 in FIG. 2.

In the differential retainer 10, the force from the first shaft is applied mainly to each recessed portion 13a of the bearing attachment portion 13. Then, the force is transmitted to the flange portion 14 through the reinforcement rib portion 18 as indicated by a bold arrow in FIG. 10 in terms of one direction and then transmitted to the mount portions 15 through the flange portion 14 as described above. This also applies to forces to be transmitted in other directions.

Note that it is also possible to gather applied forces in one part as indicated by bold arrows in FIG. 11. More specifically, the reinforcement rib portions provided in the differential retainer 10 can include two or more reinforcement rib portions 18 extending to merge at a position corresponding to one of the through-holes 16 and the mount portions 15 (in FIG. 11, the bold arrows are directed to the position of one of the through-holes 16). That is, a plurality of reinforcement rib portions to be provided in the differential retainer 10 can be formed to be directed to one of the through-holes 16 or one of the mount portions 15 in the flange portion 14. Hereby, as indicated by the bold arrows in FIG. 11, the reinforcement rib portions 18 can be disposed to form a triangular shape (that is, a triangle is formed by the reinforcement rib portions), thereby making it possible to further secure strength (in other words, it is possible to reduce the sectional areas of the reinforcement rib portions).

Further, as indicated by broken arrows in FIG. 11, it is also possible to divide an applied force. More specifically, it is preferable that the reinforcement rib portions provided in the differential retainer 10 include two or more reinforcement rib portions 17, 18 provided on the outer wall side of the differential retainer 10 and extending in a divided manner from the position of one of the recessed portions 13a. That is, it is preferable that a plurality of reinforcement rib portions to be provided in the differential retainer 10 be formed to extend from one recessed portion 13a in the bearing attachment portion 13. Hereby, as indicated by the broken arrows in FIG. 11, the reinforcement rib portions can be disposed in a triangular shape (that is, a triangle is formed by the reinforcement rib portions), thereby making it possible to further secure strength (in other words, it is possible to reduce the sectional areas of the reinforcement rib portions).

As such, since the differential retainer 10 includes the reinforcement rib portions 17, 18, it is possible to efficiently disperse the load from the first shaft. Particularly, the flange portion 14 has a function as a contacting face of the divided housing (the differential carrier 20, the differential retainer 10). Accordingly, by utilizing the function, a large reinforcement effect can be obtained and a reduction in weight can be achieved in comparison with a case where reinforcement rib portions are formed solely without utilizing the flange portion 14 or a case where the differential retainer 10 is formed to be thick without providing the reinforcement rib portions. More specifically, in comparison with a case where reinforcement rib portions are formed solely without utilizing the flange portion 14, the differential retainer 10 can achieve a reduction in weight and can also reduce the following quality deterioration problem. That is, in a case where the differential retainer 10 is manufactured by casting, it is necessary to dispose the reinforcement rib portions to cross each other or to lengthen the reinforcement rib portions, and this causes such a problem that casting quality deteriorates due to deterioration in molten metal flowability. However, the differential retainer 10 can reduce such a problem. Further, in comparison with a case where the differential retainer 10 is just formed to be thick, the differential retainer 10 can reduce such a problem that casting quality decreases due to occurrence of casting defects such as shrinkage cavity to be caused when the differential retainer 10 is manufactured by casting.

Figure 12:
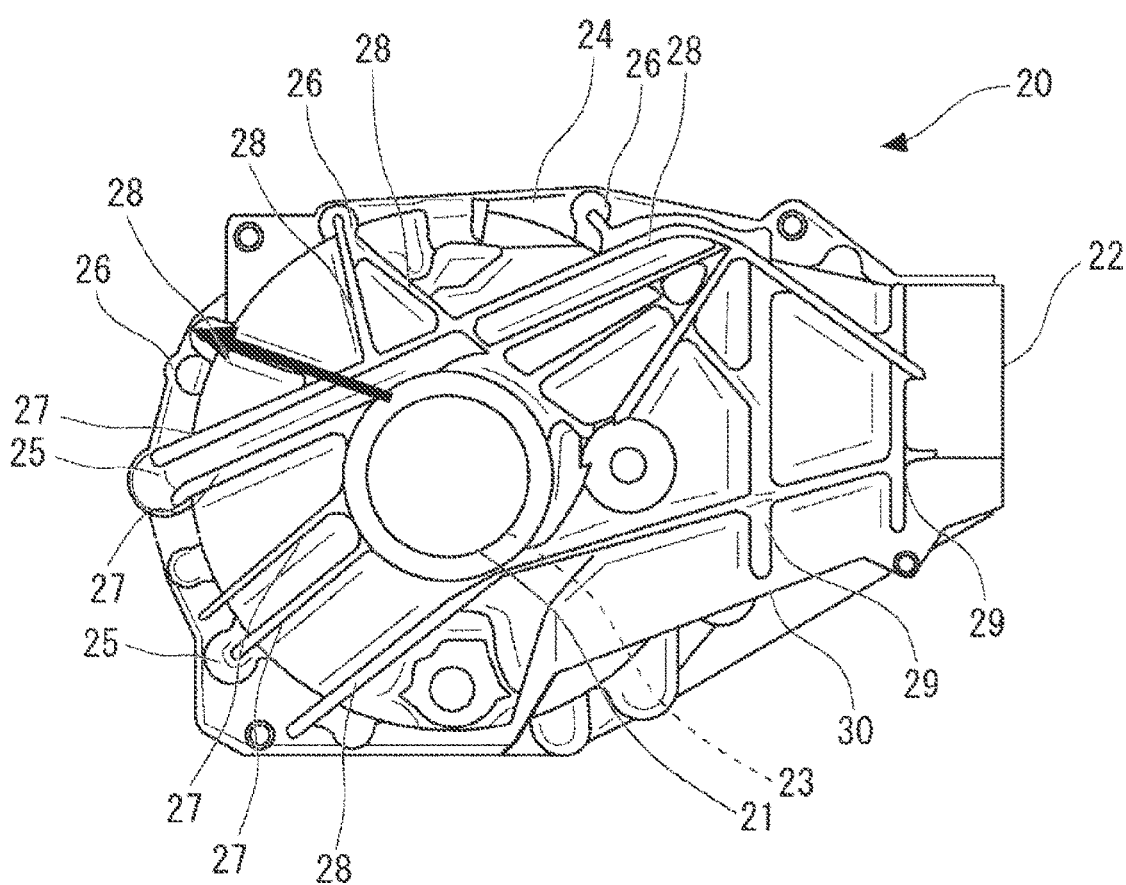
FIG. 12 is a schematic view individually illustrating a load dispersion state in the differential carrier in FIG. 3.
Figure 13:
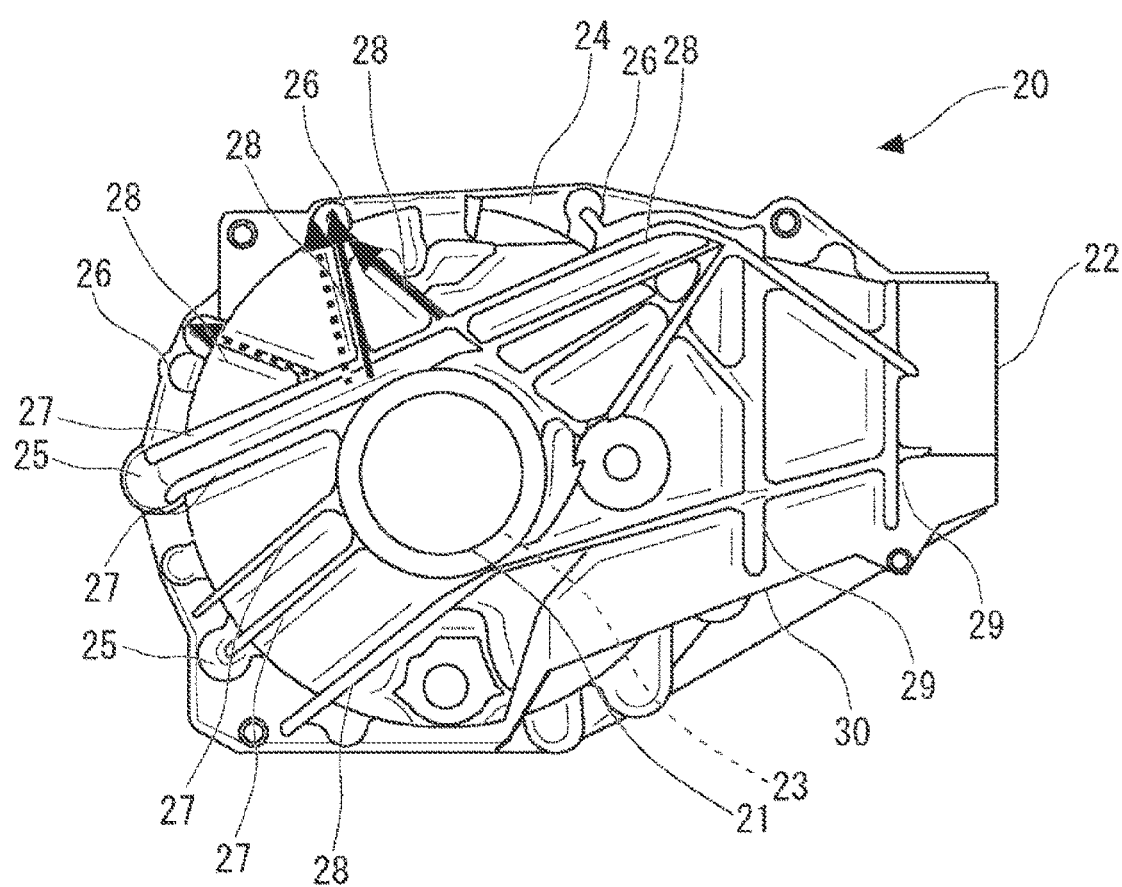
FIG. 13 is a schematic view individually illustrating a load dispersion state in the differential carrier in FIG. 3.
Figure 14:
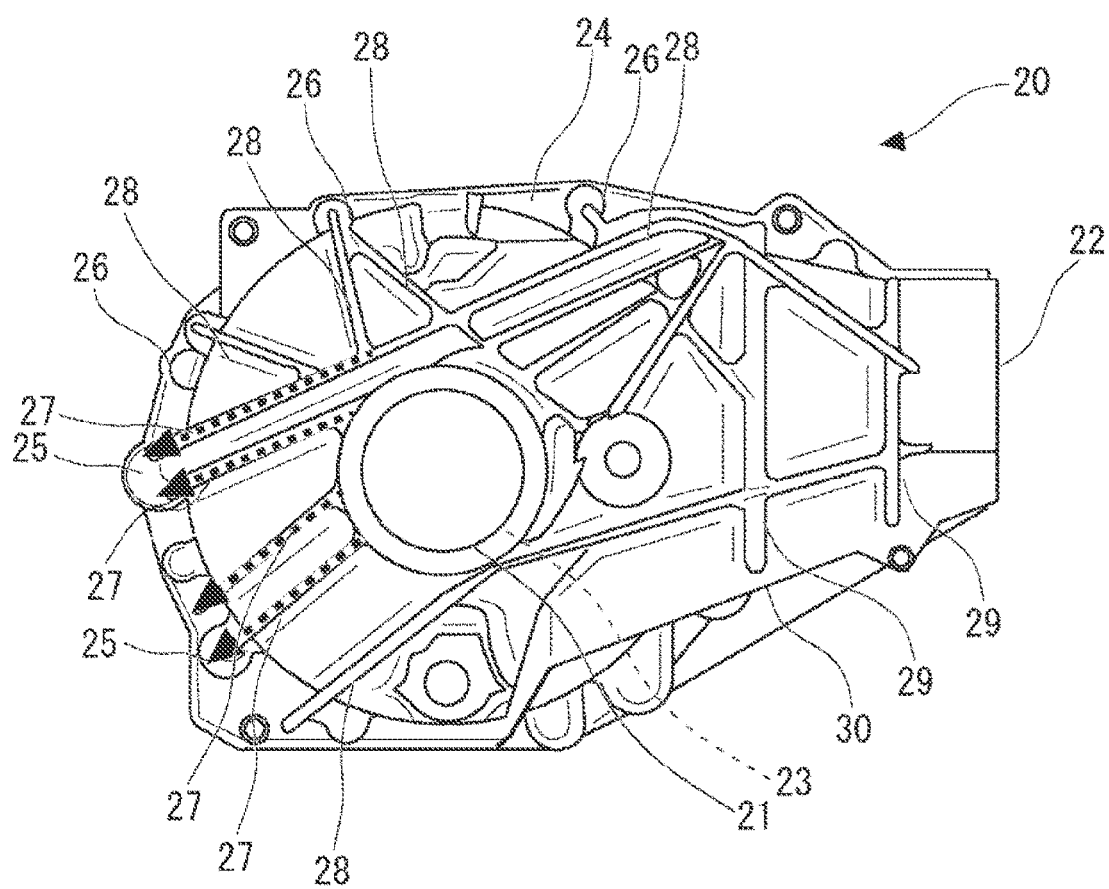
FIG. 14 is a schematic view individually illustrating a load dispersion state in the differential carrier in FIG. 3.

Next will be described details of a dispersion state of the force (load) to be applied in the differential carrier 20, with reference to FIGS. 12 to 14. FIGS. 12 to 14 are schematic views each individually illustrating a load dispersion state of the differential carrier 20 in FIG. 3.

Similarly to the above, in the differential carrier 20, the force from the first shaft is applied mainly to each recessed portion 23a of the bearing attachment portion 23. Then, the force is transmitted to the flange portion 24 through the reinforcement rib portion 28 as indicated by a bold arrow in FIG. 12 in terms of one direction and then transmitted to the mount portions 25 through the flange portion 24 as described above. This also applies to forces to be transmitted in other directions.

Note that it is also possible to gather applied forces in one part as indicated by bold arrows in FIG. 13. More specifically, the reinforcement rib portions provided in the differential carrier 20 can include two or more reinforcement rib portions 28 extending to merge at a position corresponding to one of the through-holes 16 (corresponding to the projection portions 26) and the mount portions 25 (in FIG. 13, the bold arrows are directed to the position of one of the projection portions 26). That is, a plurality of reinforcement rib portions to be provided in the differential carrier 20 can be formed to be directed to one of the projection portions 26 (projection portions corresponding to the through-holes 16)

or one of the mount portions 25 in the flange portion 24. Hereby, as indicated by the bold arrows in FIG. 13, the reinforcement rib portions 28 can be disposed to form a triangular shape (that is, a triangle is formed by the reinforcement rib portions), thereby making it possible to further secure strength (in other words, it is possible to further reduce the sectional areas of the reinforcement rib portions).

Further, as indicated by broken arrows in FIG. 13, it is also possible to divide an applied force. More specifically, it is preferable that the reinforcement rib portions provided in the differential carrier 20 include two or more reinforcement rib portions 28 provided on the outer wall side of the differential carrier 20 and extending in a divided manner from the position of one of the recessed portions 23a. That is, it is preferable that a plurality of reinforcement rib portions to be provided in the differential carrier 20 be formed to extend from one of the recessed portions 23a in the bearing attachment portion 23. Hereby, as indicated by the broken arrows in FIG. 13, the reinforcement rib portions can be disposed to form a triangular shape (that is, a triangle is formed by the reinforcement rib portions), thereby making it possible to further secure strength (in other words, it is possible to further reduce the sectional areas of the reinforcement rib portions).

Further, as indicated by broken arrows in FIG. 14, it is also possible to divide an applied force. More specifically, it is preferable that the reinforcement rib portions provided in the differential carrier 20 include two or more reinforcement rib portions 27 provided on the outer wall side of the differential carrier 20 and extending toward one of the mount portions 25 in parallel to each other. Further, although not illustrated herein, the reinforcement rib portions provided in the differential carrier 20 can include two or more reinforcement rib portions 28 provided on the outer wall side of the differential carrier 20 and extending in parallel to each other from the position of one of the through-holes 16 (a position corresponding to one of the projection portions 26). Hereby, as indicated by the broken arrows in FIG. 14, each reinforcement rib portion can be made thin (its sectional shape can be made small), thereby making it possible to efficiently secure rigidity by reducing a total sectional area. Note that a similar idea is also applicable to the differential retainer 10.

As such, since the differential carrier 20 includes the reinforcement rib portions 27, 28, it is possible to efficiently disperse the load from the first shaft. Particularly, the flange portion 24 has a function as a contacting face of the divided housing (the differential carrier 20, the differential retainer 10). Accordingly, by utilizing the function, a large reinforcement effect can be obtained and a reduction in weight can be achieved in comparison with a case where reinforcement rib portions are formed solely without utilizing the flange portion 24 or a case where the differential carrier 20 is formed to be thick without providing the reinforcement rib portions. More specifically, in comparison with a case where reinforcement rib portions are formed solely without utilizing the flange portion 24, the differential carrier 20 can achieve a reduction in weight and can also reduce the following quality deterioration problem. That is, in a case where the differential carrier 20 is manufactured by casting, it is necessary to dispose the reinforcement rib portions to cross each other or to lengthen the reinforcement rib portions, and this causes such a problem that casting quality deteriorates due to deterioration in molten metal flowability. However, the differential carrier 20 can reduce such a problem. Further, in comparison with a case where the differential carrier 20 is just formed to be thick, the differential carrier 20 can reduce such a problem that casting quality decreases due to occurrence of casting defects such as shrinkage cavity to be caused when the differential carrier 20 is manufactured by casting.

As described above, in the differential housing 1 according to the present embodiment, a load applied to the bearing attachment portion can be released to the mount portions through the flange portions via the reinforcement rib portions. In a particularly preferable example, when the reinforcement rib portions via which the bearing attachment portion is connected to the flange portion are set to (1) to (3) as follows, it is possible to more efficiently transmit the force.

(1) Fastening portions (described as the through-holes 16, the projection portions 26) are directly connected to each other.

(2) The reinforcement rib portions are designed as a plurality of ribs having smaller sectional shapes and provided in parallel to each other, instead of being designed as ribs with large sectional shapes. This makes it possible to efficiently secure rigidity by reducing a total sectional area.

(3) Two reinforcement rib portions are extended from one fastening portion and connected to each other, so that strength is secured by use of a triangle.

Accordingly, in the present embodiment, it is possible to achieve a reduction in weight by reducing the sectional areas of the reinforcement rib portions configured to disperse a load applied to the bearing attachment portion 13 and/or the bearing attachment portion 23. Further, in the present embodiment, in a case where the differential housing 1 configured as above is provided on a vehicle, it is also possible to achieve a reduction in the weight of the vehicle.

Further, as described above, any sectional shape can be employed for the reinforcement rib portions 17, 18, and any sectional shape can be employed for the reinforcement rib portions 27, 28. However, it is preferable to provide the following restrictions. The reinforcement rib portion 17 (a first reinforcement rib portion) may be set such that its sectional shape along a plane perpendicular to the extending direction of the reinforcement rib portion 17 is larger than that in the reinforcement rib portion 18 (a second reinforcement rib portion). This makes it possible to selectively reinforce the mount portion 15 that receives more load. Similarly, the reinforcement rib portion 27 (a first reinforcement rib portion) may be set such that its sectional shape along a plane perpendicular to the extending direction of the reinforcement rib portion 27 is larger than that in the reinforcement rib portion 28 (a second reinforcement rib portion). This makes it possible to selectively reinforce the mount portion 25 that receives more load.

Further, a manufacturing method for manufacturing the differential housing 1 and manufacturing methods for manufacturing components of the differential housing 1 are not limited in particular. Further, the differential housing 1 including the differential retainer 10 and the differential carrier 20 is applicable to general differential devices. For example, the differential housing 1 is applicable to an automatic transmission (AT), a continuously variable transmission (CVT), and a manual transmission (MT). Further, in terms of a plug-in hybrid vehicle (PHV) or an electric vehicle (EV), when the differential housing 1 is applied to a differential assembly for a transaxle, it is possible to downsize a unit and reduce its weight, thereby making it possible to reduce a battery usage amount.

Note that the disclosure is not limited to the above embodiment, and various modifications can be made within a range that does not deviate from the gist of the disclosure. For example, the shape of the differential housing 1 is not limited to the shape illustrated herein, including the shapes of the reinforcement rib portions.

Further, the above description deals with an example in which a plurality of reinforcement rib portions is provided in both the differential carrier 20 and the differential retainer 10, and the reinforcement rib portions are provided at the same positions corresponding to each other in the differential carrier 20 and the differential retainer 10. However, the reinforcement rib portions may be provided in different positional relationships. Further, either one of the differential carrier 20 and the differential retainer 10 may be provided with the reinforcement rib portions. However, in a case where the reinforcement rib portions are provided in both the differential carrier 20 and the differential retainer 10, strength is more secured than a case where the reinforcement rib portions are provided in either one of the differential carrier 20 and the differential retainer 10, so that the differential housing 1 can be reinforced more efficiently.

Further, the differential retainer 10 and the differential carrier 20 can be referred to as a first differential housing component and a second differential housing component, respectively. The accommodation proportion of the differential device between the differential retainer 10 and the differential carrier 20 is not limited in particular. For example, the differential housing 1 may employ such a configuration that the differential device is partially covered with the differential retainer 10 side. Further, the above embodiment is described on the premise that the differential housing 1 has a structure divided into two on a plane. However, the differential housing 1 may be divided on a three-dimensional curved surface, or the differential housing 1 may have a structure divided into three or more for assembly or the like of a differential mechanism and so on.

In any case, the differential housing can be manufactured by connecting adjacent components to each other via flange portions. Accordingly, based on a similar idea, at least either one of the differential carrier and the differential retainer can be provided with the reinforcement rib portions. Further, in terms of a component (a component including a bearing attachment portion) other than the differential carrier or the differential retainer, it is also possible to provide reinforcement rib portions configured to disperse a load applied to the bearing attachment portion.

Further, FIG. 1 and so on illustrates the differential housing 1 divided in a direction of a plane perpendicular to the Y-axis. However, the differential housing 1 is also dividable along a plane horizontal to the Y-axis (a plane passing through the opening 11 and the opening 21 or a plane that does not pass through them in FIG. 1). Even in this case, the differential housing can be manufactured by connecting adjacent components to each other via flange portions. Further, based on a similar idea, at least either one of the differential carrier and the differential retainer can be provided with reinforcement rib portions configured to disperse a load applied to the bearing attachment portion.

What is claimed is:

1. A differential housing including a differential carrier and a differential retainer, wherein:
    each of the differential carrier and the differential retainer includes:
        a bearing attachment portion to which a bearing configured to hold a shaft that extends in a first direction is attached,
        a flange portion via which the differential carrier and the differential retainer are fastened to each other, and
        a mount portion provided in the flange portion such that the differential housing is configured to be attached in the first direction to a vehicle body via the mount portion of the differential carrier and the mount portion of the differential retainer, wherein the mount portion of the differential carrier is aligned with the mount portion of the differential retainer in the first direction;
    the flange portion of the differential carrier and the flange portion of the differential retainer are fastened to each other via a plurality of through-holes provided in at least one of the flange portion of the differential carrier and the flange portion of the differential retainer, the plurality of through-holes extending in the first direction;
    one from among the differential carrier and the differential retainer includes a plurality of reinforcement rib portions provided on an outer wall side of the one from among the differential carrier and the differential retainer, the reinforcement rib portions including a first reinforcement rib portion that extends from the bearing attachment portion and stops at the mount portion of the one from among the differential carrier and the differential retainer.

2. The differential housing according to claim 1, wherein:
    the bearing attachment portion of each of the differential carrier and the differential retainer is a part where the bearing is attached to a plurality of recessed portions provided on an inner wall of each of the differential carrier and the differential retainer; and
    the first reinforcement rib portion extends from a position of one of the recessed portions.

3. The differential housing according to claim 2, wherein the reinforcement rib portions include two or more reinforcement rib portions, including the first reinforcement rib portion, provided on the outer wall side of the one from among the differential carrier and the differential retainer and extending in a divided manner from the position of the one of the recessed portions.

4. The differential housing according to claim 2, wherein shapes of the recessed portions fit shapes of projection portions provided on the bearing and are provided around the bearing.

5. The differential housing according to claim 1, wherein the reinforcement rib portions include two or more reinforcement rib portions provided on the outer wall side of the one from among of the differential carrier and the differential retainer and extending to merge at a position corresponding to one of the through-holes or the mount portion.

6. The differential housing according to claim 1, wherein the other from among the differential carrier and the differential retainer includes a plurality of reinforcement rib portions provided on an outer wall side of the other from among the differential carrier and the differential retainer, the reinforcement rib portions of the other from among the differential carrier and the differential retainer including a first reinforcement rib portion that extends from the bearing attachment portion and stops towards the mount portion of the other from among the differential carrier and the differential retainer.

7. The differential housing according to claim 1, wherein:
    the reinforcement rib portions further include a second reinforcement rib portion directed toward one of the through-holes; and
    a sectional area of the first reinforcement rib portion along a plane perpendicular to an extending direction of the first reinforcement rib portion is larger than a sectional area of the second reinforcement rib portion along a plane perpendicular to an extending direction of the second reinforcement rib portion.

8. The differential housing according to claim 1, wherein the differential carrier includes:
   an additional bearing attachment portion to which an additional bearing configured to hold an additional shaft perpendicular to the shaft is attached, and
   a U-shaped reinforcement rib portion extending from a first part of the flange portion of the differential carrier toward a second part of the flange portion by detouring around the additional bearing attachment portion.

* * * * *